Fig.-1.

June 17, 1947.  H. L. McNEILL  2,422,203
SPECIFIC GRAVITY SEPARATION OF SOLIDS IN LIQUID SUSPENSION
Filed Oct. 12, 1942  3 Sheets-Sheet 2

HARRY L. McNEILL.
INVENTOR.

BY
ATTORNEY.

June 17, 1947. H. L. McNEILL 2,422,203
SPECIFIC GRAVITY SEPARATION OF SOLIDS IN LIQUID SUSPENSION
Filed Oct. 12, 1942 3 Sheets-Sheet 3

HARRY L. McNEILL
INVENTOR.

BY *H. A. McGrew*
ATTORNEY

Patented June 17, 1947

2,422,203

UNITED STATES PATENT OFFICE 2,422,203

SPECIFIC GRAVITY SEPARATION OF SOLIDS IN LIQUID SUSPENSION

Harry L. McNeill, Denver, Colo.

Application October 12, 1942, Serial No. 461,648

26 Claims. (Cl. 241—20)

This invention relates to a treatment of solids in liquids, and more particularly relates to sink and float methods of separating constituent solids of a pulp according to size or specific gravity.

The sink and float methods heretofore used in the art have required the treatment to be performed in heavy media, for which reason sink and float methods have had only limited application to the wide variety of materials in which such separations are desired.

The concentrating methods employed in the treatment of ores such as froth and skin flotation, for example, while highly efficient in many instances, for their intended purposes, are not suited for size classification, and also require that the product taken for treatment be reduced within a size range which will float. Consequently, such treatments are not suited for application to operations involving size classification, and likewise cannot be used in separations according to specific gravity where the product contains substantial amounts of particles in sizes that will not float.

Likewise, such treatments require the location of a reagent capable of effecting a desired differential separation. Usually such a reagent can be found, but with some materials no effective separation of this type is possible. Further, in many treatments, reagent consumption is excessively high and continuance of the operation can be justified economically solely on the grounds that no better methods are known.

Gravity separation frequently is employed within the field of the present invention, and jigging, hydraulic classification, and tabling may be cited as examples of such operations. These treatments also are subject to the defect that they are unable to provide a clean and distinct separation between solids of different sizes and specific gravities.

The present invention is based on the discovery that with proper arrangement and control of centrifugal movement of a body of mixed solids in liquid, it is possible to get a clean and distinct separation between solids of different sizes and/or specific gravities in conventional aqueous pulps.

It is an object of the present invention to provide a simple, economical and efficient method for obtaining a clean separation according to size and/or specific gravity between constituent solids of a pulp in a relatively brief treatment interval.

Another object of the invention is to provide a single treatment procedure which may be employed either for size classification or concentration as required.

A further object of the invention is to provide a novel method and apparatus in which sink and float separations may be effected without introducing heavy media into the treatment and which is applicable to existing milling equipment as well as for incorporation in new equipment.

Still another object of the invention is to provide a method of ore benefication which may be utilized to increase capacity of existing plants while reducing tailings losses of such operations.

A still further object of the invention is to obtain a better separation of the valuable constituents of ores and the like than can be obtained by methods heretofore devised for such purposes.

A final object of the invention is to provide treatment methods for the benefication of ores and the like which permit the treatment of such materials in size ranges exceeding those for which prior art methods have been suited.

The present invention is well suited to the treatment of a wide variety of materials. In the field of ore treatment it is adapted for use throughout the entire range of metallic separations. As an example, the treatment of copper-bearing ores, lead-zinc ores and iron bearing ores may be cited.

The process likewise has application in the field of non-metallic separations. Examples of these which may be cited are coal washery operations, the treatment of potash ores and the like.

As previously indicated, the treatment of the present invention may be performed at various stages of the usual milling operation. For example, it may be applied at the crushing stage for the removal of concentrates in sizes not amenable to conventional ore dressing methods. It is particularly effective as a means for obtaining sands-slimes separations and can be conveniently installed in classifiers, particularly of the reciprocating rake type operating in closed circuit with a grinding mill.

The treatment likewise may be employed as a substitute for many conventional concentrating methods and, in particular, affords an excellent replacement for concentrating table operations heretofore in use.

Likewise, it is possible to incorporate the present treatment in a single treatment stage in which the dual function of size classification and concentration is performed. When the invention is utilized in concentration, it may treat products too poor in value for other operations as, for example, the waste rock eliminated from the ore before treatment in an existing milling operation, or it may be used as a replacement for other concentrating methods as previously described The pulp-forming stage of the operation does not require any special control and may involve the production of an aqueous pulp in accordance with conventional practice in the treatment of ores. Similarly in the non-metallic field as, for example, a froth flotation separation of ore constituents where the soluble salts are suspended in mother liquor, such a pulp may be utilized in the present treatment.

After the pulp is formed, it is introduced into a confined zone preferably of conical shape and having an upper discharge for lighter solids and a lower discharge for heavier solids. Before the operation is begun, an initial determination is made with respect to size or specific gravity or both. To establish a velocity or specific gravity or both, to establish a separative velocity at which all particles over the predetermined size or specific gravity will sink in the treatment, while all below said predetermined size or specific gravity will float. Obviously, in forming the media of such a separation, the feed material does not escape from said zone as rapidly as it is fed thereto, until it is in condition to perform the separation. Thus, the media become self-sustaining and comprise a body of fluidized solids, i. e., a mixture of solids and a fluid in which the fluid is present in insufficient quantity or activity to maintain any appreciable portion of the solids in suspension.

The centrifugal action at the velocity selected by said initial determination causes two distinct zones of material to form in the body under treatment. The heavier particles, that is those above the predetermined size or specific gravity, are thrown to the outside and there form a rotating body of such density that the lighter materials below the predetermined limit are unable to penetrate. Thus, a hindered settling action is employed to attain the desired separation.

The impelling action of the centrifugal movement is utilized to impart an upward component in the interior zone of lighter material, which thereby is readily removed from the treatment stage by overflow.

At the same time a downward component is imparted to heavier material in the outermost zone as an opposite reaction to the aforesaid upward component, with the result that by providing a lower discharge outlet a clean and rapid separation is effected.

To afford a better understanding of the invention, reference will be made to the accompanying drawings illustrating typical applications of the use of the invention and embodiments of the invention.

In the drawings in the several views of which like parts have been designated similarly.

Figure 1:
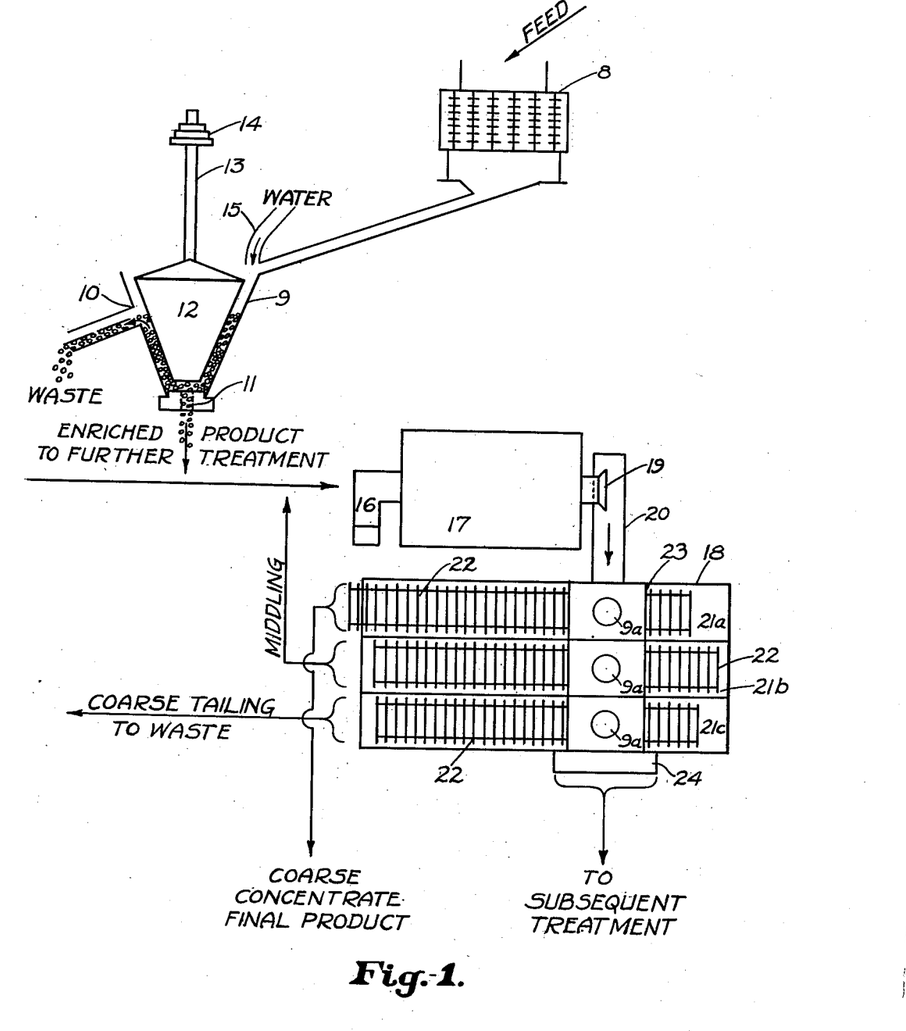
Figure 1 is a diagrammatic flow sheet illustrating the use of the present invention in standard milling circuits.

As previously explained, the present invention may be utilized at different treatment stages of conventional milling operations. In Figure 1, such a circuit has been illustrated diagrammatically. Incoming feed either wet or dry enters a crushing unit such as the well known Symons cone, for example. The solids of the feed constitute a relatively coarse product and require considerable reduction in size to constitute a proper product for introduction into the ball mill or other grinding mechanism of a grinding circuit. The product discharged from the crusher 8 is then passed to a separator 9 embodying features of the present invention.

This separator comprises a tank, preferably of conical or cylindrical shape, having in its upper portion a peripheral overflow 10 for lighter material and a submerged discharge for heavier solids, said discharge preferably being a central bottom outlet 11. Material in the tank is subjected to centrifugal movement at relatively high velocity by a rotary impeller 12, preferably in the form of a cone, filling a substantial portion of the tank. Rotation of the cone is provided by a shaft 13 carrying one or more pulleys 14 connected with a prime mover not shown.

By having a plurality of pulleys of different diameter mounted on said shaft, it is possible to employ variable speed operation thereby permitting a single treatment unit to function either as a classifying element or a concentrator.

Where the crushing operation employs no water, it is necessary to introduce water into the feed to separator tank 9 and this can be done by the provision of a spigot supply 15 preferably located adjacent a point of feed introduction.

The feed to tank 9 is subjected to rapid centrifugal movement by impeller 12, with the result that the solids are impelled outwardly from the impeller and because of differences in size or specific gravity, form two distinct zones of material in the space between the impeller and the walls of the tank. The outermost zone is a rotating mass of relatively high density into which the inner mass of lighter material is unable to penetrate.

Due to the conical arrangement of tank and impeller, material in the upper portion of the tank is caused to move differentially and at a higher velocity than the material adjacent the lower end of the impeller. The frictional contact of the impeller surfaces with the lighter material adjacent thereto, coupled with this differential rate of movement, serves to impart an upward component to the body of lighter material in conjunction with the centrifugal action and, as a consequence thereof, the heavier material in the outermost zone incurs a downward component accelerating normal settling tendencies, which are relatively slow because of the restriction of the lower discharge opening.

Following this separation of the material into inner and outer zones, the heavier solids are held against the surfaces of the vessel and move to the discharge outlet in a downward spiral path at low velocity and substantially free from liquid suspension, whereas the inner zone containing most of the liquid and the lighter solids travels at high velocity in an ascending spiral path.

In operation, an initial determination of velocity is made at which particles above a given size and specific gravity will not remain in suspension in the fluent mass or media of said treatment, while all material below said size and specific gravity will remain in suspension. When actual operation is commenced, the impeller 12 is set to rotate at a predetermined speed necessary to give the material the predetermined velocity, by location of the belt or other power transmission means on the proper size pulley for operation by the prime mover.

Thereafter the unit functions under continuous feed and discharge to discharge heavier solids through opening 11, while the lighter gangue material overflows at 10 and passes to waste. The heavier product of this separation contains substantially all the valuable constituents passing from the crusher, and by eliminating a substantial portion of the bulk of such product constituting worthless matter, the treatment capacity of a given operation is materially increased.

The enriched product discharging through outlet 11 is fed to the scoop 16 of a grinding mill 17, which may be a ball mill, rod mill or the like, and such product is subjected therein to further reduction in size.

In preferred practice, the mill 17 operates in closed circuit with a classifier unit 18 and the mill discharge passing through outlet 19 is conducted by a suitable launder 20 to the classifier unit 18 and discharged into the same, preferably in a substantially horizontal direction at or near the surface of the liquid body under treatment therein.

As illustrated in Figure 1, the classifier unit is of the reciprocating rake type having three physically separated compartments 21a, 21b and 21c, in each of which reciprocating rakes 22 are employed to move settled solids in the respective compartments to an elevated point of discharge.

In preferred practice, the classifier unit 18 is provided with a passageway 23 extending completely across the tank transversely to rakes 22.

In my copending application Serial No. 289,466, filed August 10, 1939, for Classification methods and apparatus, issued as Patent No. 2,315,536 on April 6, 1943, I have disclosed a structural arrangement and treatment method of this general type and features disclosed but not claimed herein have been made the subject matter of the claims of the aforesaid application.

In place of the hindered settling cones of my aforesaid application, I prefer in present practice to incorporate a treatment unit 9a in each of the compartments 21a, 21b and 21c constructed and functioning in a similar manner to the unit 9 hereinbefore described, but of lesser size.

With this arrangement, incoming feed delivered from launder 20 can pass into the compartments 21a, 21b and 21c only through the bottom outlets 11 of the respective units 9a. Each of said units functions to discharge all the lighter constituents at the upper peripheral overflow, with the result that there is a progressive movement of such lighter constituents containing all the size within the range of finished material to an overflow 24, here shown as located directly opposite launder 20.

The product overflowed at 24 contains substantially no oversized middling and all constituent solids therein have been reduced to sizes requiring no further grinding. Consequently, it is in ideal condition for subsequent treatment such as froth flotation, cyanidation or the like.

The respective units 9a of classifier 18 are operated at different velocities to effect differential separation of the constituent solids. To this end, the first unit 9a discharging into compartment 21a is operated at a sufficiently high velocity to separate the coarsest sizes according to specific gravity and the discharge into compartment 21a thus comprises essentially coarse metallic constituents with no appreciable amount of gangue of corresponding size therein. The overflow of this treatment containing substantial quantities of middlings product within the size range of the initial treatment as well as smaller sizes, is then passed to the second treatment unit 9a.

In this unit the velocity is less than that in the first unit but sufficiently high to effect a separation according to specific gravity, in which substantially all of the middlings product of the grinding operation is discharged through the outlet 11 of said unit 9a.

The overflow product of this treatment containing valuable constituents within the size range of finished material as well as coarse tailings of relatively light weight, is then passed to the third treatment unit 9a. In this unit, the velocity is controlled to effect a size classification with coarser tailings discharged through its outlet 11, while particles of all types within the size range of finished material are caused to pass out of the peripheral overflow and thence move out of classifier 18 across overflow 24.

The raked product of compartment 21a being substantially free of gangue constituents requires no further treatment and is collected as a concentrate and removed from the operation.

The raked product of compartment 21b containing substantially all the middlings product of the grinding discharge within the size range requiring further grinding, is returned through mill scoop 16 to the mill 17 for regrinding.

The raked product of compartment 21c being substantially free from any mineral content due to the prior removal of the coarser content in compartment 21a, the middling content in compartment 21b and the overflow of the finished product from the final unit 9a, constitutes worthless matter and is passed to waste.

Features of the separation methods in the closed circuit operation just described which have been described but not claimed herein, have been made the subject matter of claims in my co-pending application Serial No. 447,763, filed June 20, 1942, for Method of ore dressing.

Figure 2:
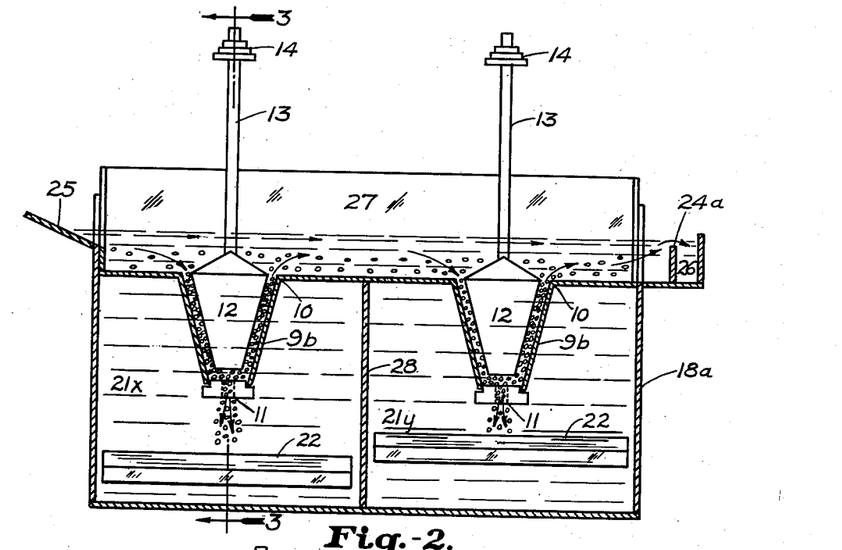
Figure 2 is a section taken through a classifier tank of the reciprocating rake type, showing the application of the present invention thereto.
Figure 3:
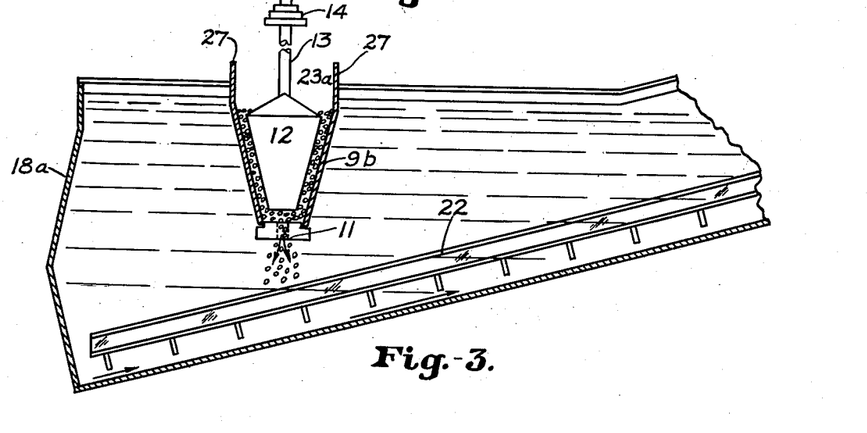
Figure 3 is a fragmentary section taken along the line 3—3 of Figure 2.

In Figures 2 and 3 the invention has been illustrated as applied to a two-compartment or duplex type classifier also of the reciprocating rake type. The details of this construction are essentially the same as those shown diagrammatically with reference to the classifier 18 of Figure 1 and it will be understood that when a three-compartment tank is used, a third compartment similar in all respects to those shown in Figure 2, will be inserted between the two compartments therein illustrated.

The classifier tank 18a in Figure 2 is provided at one side with a feed box or launder 25 and an overflow 24a at its opposite side. A launder 26 is provided to conduct the overflow to subsequent treatment. A passage 23a defined by parallel plate members 27 extends across tank 18a from inlet 25 to overflow 24a. Beneath this passage the tank is divided by a partition 28 into two treatment compartments 21x and 21y.

Located along the bottom of the passage 23a and extending into each of the compartments 21x and 21y is a centrifugal separator 9b, also constructed and functioning in a manner similar to unit 9 previously described.

Each of the units 9b has a bottom discharge 11, a peripheral overflow 10, and a rotary impeller 12 carried on a shaft 13 having a series of pulleys 14 to be driven by a prime mover (not shown) and providing variable speed regulation.

Incoming feed delivered to passage 23a from feed launder 25 enters into the first unit 9b and is there subjected to centrifugal movement at a predetermined velocity at which only coarse free mineral and larger middlings will be discharged through outlet 11 and thereby constitute the feed to compartment 21x.

The overflow of this separation passing out at 10 travels along passage 23a until it enters the second unit 9b. The impeller of this unit is operated at reduced velocity to permit fine middlings and coarser tailings to discharge through outlet 11 while all solids within the size range of finished product pass across overflow 10 of this unit and thence from the tank across overflow 24a.

Figures 4, 5, 6, 7:
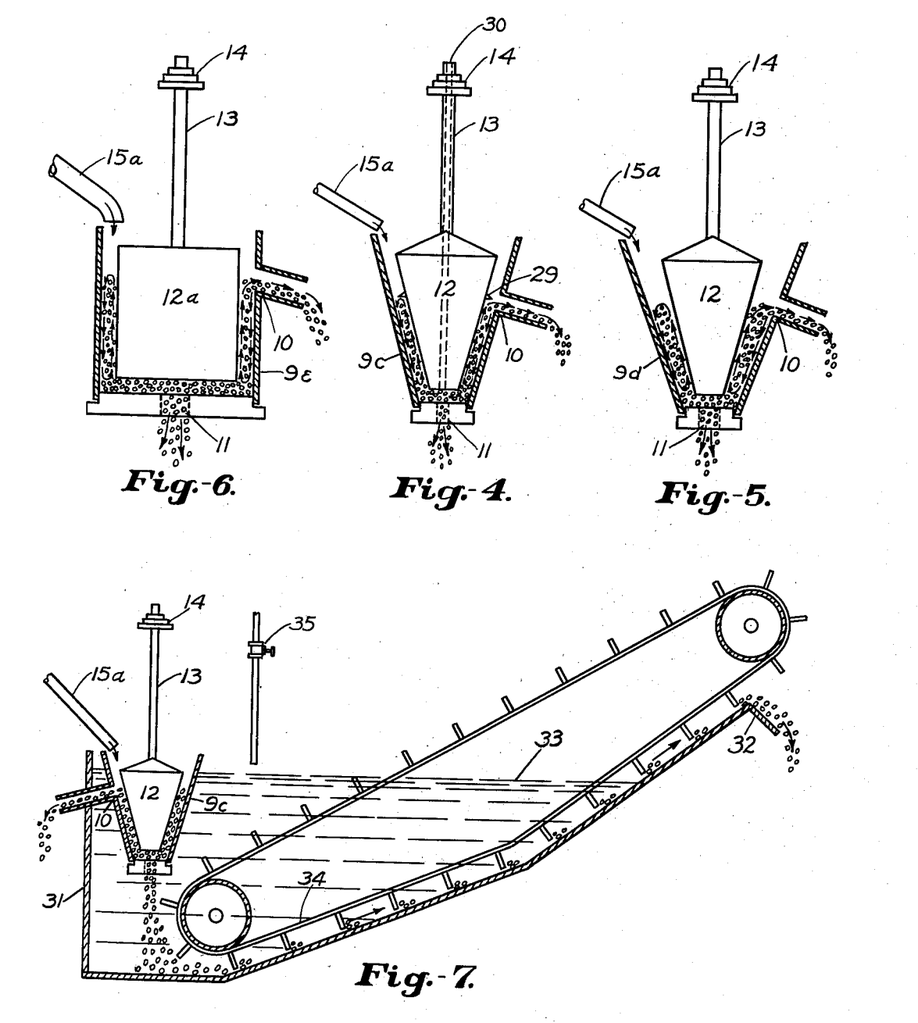
Figure 4 is a vertical central section through a single treatment unit, illustrating one embodiment of the present invention.
Figure 5 is a vertical central section through another treatment unit, illustrating another embodiment of the present invention.
Figure 6 is a vertical central section through still another treatment unit, embodying a further modification of the present invention.
Figure 7 is a vertical central section through a treatment tank, illustrating a still further embodiment of the present invention.

Referring next to Figures 4, 5 and 6, various structural embodiments of the separator unit have been illustrated. In the design of Figure 4, the tank 9c is conical and provided with a submerged discharge outlet, here shown as comprising a central bottom opening 11. Adjacent its top the tank 9c has a peripheral overflow 10 and its hollow interior is substantially filled by a conical impeller 12 carried on the usual shaft 13 driven by pulley unit 14.

The conical surfaces of impeller 12 and tank 9c in this embodiment are parallel and a throw ring 29 is held on impeller 12 adjacent outlet 10 to direct elevated material into the same. Feed to unit 9c is supplied by a suitable conduit 15a preferably having its discharge outlet located at a point remote from overflow 10.

When it is desired to adapt a given separator unit for a treatment differing from the one previously performed, it sometimes will be desirable to change the size of outlet 11 so that it will discharge all the concentrate, but restrict discharge of other constituents. This may be done in various ways but a simple expedient is to employ plugs with different sized orifices as the bottom closure for the treatment tank. This feature has been illustrated in Figures 4, 5 and 6. Also, at the beginning of the operation, it is preferable to completely close the outlet until the media of the treatment has been formed by plugging the orifice of suitable size selected for the continuing operation.

The structure illustrated in Figure 5 is similar in structure and function to that shown in Figure 4, with the exception that the walls of the tank 9d are set at a greater angle than the conical surface of impeller 12 to cause the space therebetween to progressively widen from the bottom to the top. In the treatment of certain materials it will be desirable to have such an arrangement to accelerate the upward and downward movements in the respective solids zones.

The form of structure illustrated in Figure 6 is generally similar to the separators previously described, particularly as to function, but differs in that the tank 9e is cylindrical and the impeller element 12a likewise is cylindrical. Despite these structural differences the operation of the device is substantially as described hereinbefore.

Figure 7 illustrates the application of one of the separator units to a treatment tank intended for operations where the underflow product requires dewatering. Usually such an operation will involve the introduction of liquid into the treatment bath in addition to that present in the incoming feed. This is done to replace water entrained with solids discharged from the treatment and also is utilized to provide whatever back flow may be necessary in the cone.

In this form of structure, a tank 31 has a separator unit 9c such as that shown in Figure 4, mounted in the upper portion of the tank with the overflow 10 discharging through a wall of the tank 31. The tank 31 preferably has an elevated point of discharge 32 at an elevation considerably higher than the overflow level of liquid in the tank as indicated at 33.

Heavier solids discharging from unit 9c into the bottom of the tank are acted upon by an endless conveyor 34 and moved to such elevated point of discharge. The lighter solids overflowing from tank 9c at 10 pass out to a subsequent treatment or to waste.

In order to supply liquid in a volume in excess of that contained in the pulp introduced through the usual feed conduit 15a, a valve-controlled supply conduit 35, preferably mounted in overhanging relation to tank 31, is provided. Through regulation of the valve in supply conduit 35, liquid in any desired amount can be introduced into tank 31 to supplement the feed through 15a.

While in the preferred forms of the invention as illustrated in Figures 4, 5 and 6, the tank and impeller are of circular contour and the former is stationary while the latter is rotary, other arrangements may be employed within the spirit and scope of the invention.

Under some circumstances, it may be desirable to aerate the material subjected to centrifugal movement. This can be done in different ways, such as that disclosed in my co-pending application Serial No. 289,466. Another way is to introduce the gas into the bottom opening 11 of the tank from which it will rise, and being low in specific gravity will be crowded to the inside to assist the differential movement between the inner and outer bodies of rotating solids. This can be done by employing a hollow passage through shaft 13 and cone 12 for the intake of air as shown at 30 in Figure 4.

With certain types of materials where size separation is to be made in material of the same specific gravity, it may be necessary under certain conditions to accelerate the differential separation induced by the centrifugal movement. This can be done by entering chilled shot or glass or porcelain balls into the material being rotated in the cone, such additives being of a size that will not underflow.

With this understanding of the structural embodiments for performing the process of the present invention, reference will now be made to certain typical treatments in which the invention may be utilized effectively.

Where the invention is to be utilized in existing plants, it can be incorporated into the treatment with only relatively minor changes in existing equipment and when properly utilized will effectively increase plant capacity.

For example, in the treatment of ores, it is recognized that most tailings losses occur in the extremely fine sizes. This is due to the fact that much of the material of the treatment is reduced to slimes, whereas a much coarser product constitutes the optimum material for treatment.

Where it is desired to incorporate the present process into the grinding circuit as by installation at the classification stage, an arrangement such as that disclosed in Figure 1 or in Figures 2 and 3 may be utilized.

This control serves to pass directly through the classifier and on to subsequent treatment all material within the size range of finished product, i. e., solids reduced to a size which requires no further grinding.

Similarly, coarse tailing containing no appreciable quantity of mineral is eliminated. This product constituting a substantial bulk of the solids content serves no useful purpose if retained in the circuit and its elimination has the effect of materially increasing capacity both in the grinding circuits and in subsequent treatments.

In addition to this, the use of the present invention is advocated in the crushing plant ahead of the grinding circuit. The discharge of the crushing operation is a relatively coarse product containing many particles of such size that differential separation of mineral from gangue in such size ranges is not feasible by existing methods.

However, by proper control of the velocity regulation, such product may be treated in one of the separators of the present invention to eliminate lighter gravity waste material in coarse sizes and in this way constitute the feed to the grinding circuit, a product containing particles of sufficient value to warrant incurring the subsequent treatment cost to attain their final reduction and separation of constituents.

As a consequence of such preliminary treatments, the finished product passing from the grinding circuit to flotation or other recovery stage can be substantially coarser than in former practice, without containing appreciable quantities of middlings product or excessive gangue. In this way, the production of excessive slimes is avoided with tailings losses substantially reduced.

From the foregoing, it will be apparent that by the prompt elimination of worthless matter in the pulp-forming stage of the treatment, the useful work of the more expensive subsequent treatments can be confined largely to the treatment of valuable material. Because of this, it is possible to utilize the present treatment in the processing of ore bodies heretofore considered too low in grade to warrant treatment on a commercial scale. This initial elimination of the worthless matter being a relatively low cost operation, permits the subsequent and more costly treatments to be performed on material of relatively high value due to the elimination of the bulk of the valueless content of its natural formation.

This treatment likewise will have application in coal washing operations as the sulfides and slate can be settled readily in the sink and float treatment while the lighter gravity coal will overflow.

Likewise, where river sand has to be deslimed and size separated into different products, the present invention affords a simple, economical and efficient method of attaining the desired separation.

As an example of the economy of the present process in the treatment of a supposedly worthless material, the following test procedure is cited:

Waste dump ore from the London Mine, Alma, Colorado, was taken for treatment in a separator of the type illustrated in Figure 4. This ore was identified as auriferous pyrite and assayed $3.66 per ton in gold. The sample was crushed to all minus 6 mesh and subjected to a centrifugal velocity of 350 R. P. M. in the separator.

The screen analysis of the separated products follows:

| Mesh | Conc. | | | Tails | | |
|---|---|---|---|---|---|---|
| | Grams | Per cent Wt. | Gold | Grams | Per cent Wt. | Gold |
| | | | Ounces | | | Ounces |
| 6/8 | 22.1 | 9.0 | 0.42 | 273 | 22.8 | 0.075 |
| 8/10 | 48.7 | 19.8 | 0.29 | 238 | 20.0 | 0.060 |
| 10/14 | 65.3 | 26.6 | 0.22 | 163 | 13.7 | 0.060 |
| 14/20 | 38.2 | 15.5 | 0.23 | 119 | 10.0 | 0.060 |
| 20/28 | 26.5 | 10.8 | 0.27 | 107 | 9.0 | 0.055 |
| 28/35 | 12.2 | 4.9 | 0.28 | 77 | 6.5 | 0.060 |
| 35/48 | 12.7 | 5.4 | 0.32 | 68 | 5.6 | 0.065 |
| 48/65 | 9.4 | 3.8 | 0.33 | 52 | 4.4 | 0.070 |
| 65/100 | | | | 39 | 3.3 | 0.060 |
| 100/150 | 10.4 | 4.2 | 0.38 | 32 | 2.7 | 0.080 |
| 150/200 | | | | 24 | 2.0 | 0.070 |
| | 245.5 | | | 1,192 | | |

In the following tabulation based on this operation, it was determined that 83% of the product could be eliminated in advance of the grinding stage and the material so eliminated would have a value of only slightly over $2.00 per ton:

*Recovery of values*

|  |  | Per Cent Weight |
|---|---|---|
| Total number of grams in Conc. | 245.5 | 17.0 |
| Total number of grams in Tails | 1192.0 | 83.0 |
|  | 1437.5 | 100.0 |

Ratio of concentration $\frac{1437.5}{245.5} = 5.85:1$ 100 tons of heads will produce:
17 tons of Conc. @ 0.304×$35.00=$181.00=$10.64/ton
83 tons of Tails @ 0.065×$35.00=$189.00=$ 2.28/ton

|  | $370.00 |
|---|---|
| Check 100 tons @ $3.66 | 366.00 |
| Error within laboratory limits | $ 4.00 |

In this particular operation based on experience over a number of years, it has been found that the tailings loss per ton averages $1.00, while mill cost below the crushing plant would average at least $1.00 per ton. Therefore, the dump ore taken for this test is properly eliminated in the commercial operation as the cost of recovery does not justify the treatment of such product.

However, it is possible to calculate from the aforesaid test the economic advantage that would be gained by installation of such a treatment unit to handle the product passing from the crushing plant to the grinding stage. These computations follow:

*Estimate of costs on handling such a waste dump*

| Handling dump to crushing plant | .50/ton |
|---|---|
| Primary and secondary crushing | .30/ton |
| Beneficiation and tails disposal | .20/ton |
|  | $1.00/ton |

Every 100 tons produce 17 tons of concentrate requiring further treatment:

| Treatment @ $1.00/ton | .17 |
|---|---|
| Tailings loss @ $1.00/ton | .17 |
|  | 1.34 |

Recovery per ton of head ore _______ (1.81−1.34) =.47/ton
On treating 100,000 ton waste dump _______ $47,000.00 Profit It will be obvious from the foregoing example that if such low grade ore can be treated economically through the utilization of the present invention, the application of the treatment to higher grade ores will be even more valuable.

Particularly, under present day conditions, when there is an urgent need to increase milling capacity without resort to the expense and delay of enlarging plants, the present invention affords a most satisfactory solution to the problem.

In the preceding description in which various structural arrangements have been described as embodiments of the invention, no reference has been made to interchangeability of the various designs in given treatments. It will be understood that the various forms of separator units 9, 9a, 9b, etc. may be used wherever the centrifugal separation of the present invention is to be employed.

Likewise, where the separator unit is to be utilized in a classification stage, any of the tank installations illustrated herein or suggested modifications thereof may be employed for the purposes of the present invention.

The separator units per se likewise are susceptible of modifications in addition to those enumerated herein. For example, the distance between the overflow outlet and the underflow outlet of a tank will vary according to the type of separation to be performed therein. Where coarse separations are practiced, it usually will be desirable to have the distance between overflow and underflow less than is necessary where finer separations are performed.

Also, with reference to the impellers, certain preferred forms have been shown. It will be obvious that a combination of the cylindrical and conical may be employed, if desired, such impeller being what may be termed a cylindroconical shape. While the illustrations, all of which are more or less diagrammatic, suggest smooth surfaces for the impellers, it will be obvious that where additional friction is desired to promote the centrifugal action or to accelerate the ascending and descending movements, a rough surface may be provided.

The description of the action in the classification stage represents a preferred mode of treatment and, for this reason, the differential velocity regulation has been specified. However, it will be apparent that in certain treatments a single pass through a separator unit may not be sufficient to attain the desired degree of separation, in which case the overflow product of a first unit can proceed to a second similar unit operating at the same velocity and the action repeated therein.

Likewise, in such a classification stage, the initial separation may be directed to the separation of a plurality of metallics from gangue and then the metallic concentrate of such an operation would be subjected to further treatment for the separation of its constituent minerals. The treatment of lead-zinc ores is typical of such practice.

Usually when ore is being treated the mineral content will be of greater specific gravity than the associated gangue. Consequently, the underflow will contain the valuable constituents while the overflow product will constitute waste matter. In certain operations the reverse of this is true as in coal washing, for example, in which case the underflow product would contain the worthless matter (slate and the like), while the overflow product would comprise essentially cleaned coal.

It should be noted in the foregoing examples of sink and float separations that the treatments do not require the introduction of a separation media from an outside source, but merely involve the centrifugal movement of the material under treatment in the manner prescribed to form a media within the body under centrifugal influence, which may be termed "heavy media," but which in fact is a selective media containing constituents of both the sink and float products of the separation, brought together to form a body or zone of sufficiently high density or viscosity to cause the lighter constituents to float readily thereon.

It will be understood that the description and illustration of structural arrangements, plant installations and operating procedure set forth hereinbefore are merely typical examples of the uses of the invention and are not intended as a limitation thereof.

Changes and modifications may be availed of within the spirit and scope of the invention as defined in the hereunto appended claims.

What I claim and desire to secure by Letters Patent is:

1. In the ore dressing art, in which ore is ground in closed circuit with classification, the improvement which comprises subjecting the discharge of the grinding stage to a succession of centrifugal sink and float separations at the classification stage to maintain the finished product at or near the surface, discharging finished material floated in such succession of stages directly out of the closed circuit, removing a coarse concentrate from the closed circuit as the non-floated product of one of said sink and float separations, and removing a coarse tailing from the closed circuit as the non-floated product of another of said sink and float separations.

2. The method of treating solids in liquids, which comprises the treatment of such a material in an arcuate vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to horizontal centrifugal movement along one margin thereof relative to an opposite margin thereof, until it becomes a self-sustaining mass of fluidized solids with only sufficient liquid to maintain its fluent condition, and continuing said movement while feeding said material into the upper portion of said media body at a rate substantially equal to the rate of products discharge and thereby separating the constituents of said feed according to their sink and float characteristics in order to remove said constituents from the treatment as the respective discharge products.

3. The method of treating solids in liquids, which comprises the treatment of such a material in an arcuate vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to horizontal centrifugal movement along one margin thereof relative to an opposite margin thereof, until it becomes a self-sustaining mass of fluidized solids with only sufficient liquids to maintain its fluent condition, continuing said movement while feeding said material into the upper portion of said media body at a rate substantially equal to the rate of products discharge and thereby separating the constituents of said feed according to their sink and float characteristics in order to remove said constituents from the treatment as the respective discharge products, and delivering a restricted quantity of water to the lower end of the bone to maintain the fluent condition of the media.

4. The method of treating solids in liquids, which comprises the treatment of such a material in a substantially annular vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to horizontal centrifugal movement along one margin thereof relative to an opposite margin thereof, until it becomes a self-sustaining mass of fluidized solids with only sufficient liquid to maintain its fluent condition, and continuing said movement while feeding said material into the upper portion of said media body at a rate substantially equal to the rate of products discharge and thereby separating the constituents of said feed according to their sink and float characteristics in order to remove said constituents from the treatment as the respective discharge products.

5. The method of treating solids in liquids, which comprises the treatment of such a material having a slimes content in an arcuate vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to horizontal centrifugal movement along one margin thereof relative to an opposite margin thereof until it becomes a self-sustaining mass of fluidized solids with only sufficient liquid to maintain its fluent condition, and continuing said movement while feeding said material into the upper portion of said media body at a rate substantially equal to the rate of products discharge and thereby separating the constituents of said feed, including said slimes content, according to their sink and float characteristics in order to remove said constituents from the treatment as the respective discharge products.

6. The method of treating solids in liquids, which comprises the treatment of such a material in a vertically-disposed annular conical zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to horizontal centrifugal movement along its inner margin relative to its outer margin, until it becomes a self-sustaining mass of fluidized solids with only sufficient liquid to maintain its fluid condition, continuing said movement while feeding said material into the upper portion of said media body at a rate substantially equal to the rate of products discharge to cause a relatively rapid ascent of low specific gravity solids on the inner margin and a delayed descent of high specific gravity solids on the outer margin, whereby to separate the constituents of said feed according to their sink and float characteristics, and directing a liquid into said zone through the sink product discharge in a quantity sufficient only to maintain the self-sustaining mass in fluent condition.

7. The method of treating solids in liquids, which comprises the treatment of such a material in a substantially annular vertically-disposed zone having top and bottom discharges of float and sink products, said zone being sufficiently narrow throughout its vertical extent so that certifugal effects are produced in the movement of material throughout said zone, forming a body of media in said zone by initially feeding material thereto in a quantity in excess of the rate of discharge therefrom, densifying said media by imparting a viscous flow to the media throughout said zone until it becomes a self-sustaining mass of fluidized solids with only sufficient liquid to maintain its fluent condition, and continuing said movement while feeding said material into the upper portion of said media body at a rate substantially equal to the rate of products discharge and thereby separating the constituents of said feed according to their sink and float characteristics in order to remove said constituents from the treatment as the respective discharge products.

8. The method of treating solids in liquids, which comprises the treatment of such a material in a substantially annular, vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media by establishing a continuous differential, rotative movement between the inner and outer margins of said zone until it becomes a self-sustaining mass of fluidized solids with only sufficient liquid to maintain its fluent condition, and continuing said movement while feeding said material into the upper portion of said media body at a rate substantially equal to the rate of products discharge and thereby separating the constituents of said feed according to their sink and float characteristics in order to remove said constituents from the treatment as the respective discharge products.

9. The method of treating solids in liquids, which comprises the treatment of such a material in a substantially annular, vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to centrifugal movement along one margin thereof relative to an opposite margin thereof, until it becomes a self-sustaining mass of fluidized solids with only sufficient liquid to maintain its fluent condition, and continuing said movement while feeding said material into the upper portion of said media body at a rate substantially equal to the rate of products discharge to cause the low specific gravity product to move upwardly and the high specific gravity product to move downwardly in said zone, thereby separating said constituents according to their sink and float characteristics in said zone.

10. The method of treating solids in liquids, which comprises the treatment of such a material in a substantially annular, vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to centrifugal movement along the inner margin relative to its outer margin, until it becomes a self-sustaining mass of fluidized solids with only sufficient liquid to maintain its fluent condition, and continuing said movement while feeding said material into the upper portion of said media body at a rate substantially equal to the rate of products discharge to cause the low specific gravity product to move upwardly at the inside and the high specific gravity product to move downwardly at the outside of said zone, thereby separating said constituents according to their sink and float characteristics in said zone.

11. The method of treating solids in liquids, which comprises the treatment of such a material in a substantially annular, vertically disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to centrifugal movement along its inner margin relative to its outer margin, until it becomes a self-sustaining mass of fluidized solids with only sufficient liquid to maintain its fluent condition, and continuing said movement while feeding said material into the upper portion of said media body at a rate substantially equal to the rate of products discharge to cause the low specific gravity product to move upwardly and the high specific gravity product to move downwardly in said zone, thereby separating said constituents according to their sink and float characteristics in said zone.

12. The method of treating solids in liquids, which comprises the treatment of such a material in a substantially annular, vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to horizontal centrifugal movement along one margin thereof relative to an opposite margin thereof, until it becomes a self-sustaining mass of fluidized solids with only sufficient liquid to maintain its fluent condition, containing said movement while feeding said material into the upper portion of said media body at a rate substantially equal to the rate of products discharge and thereby separating the constituents of said feed according to their sink and float characteristics in order to remove said constituents from the treatment as the respective discharge products, and introducing liquid upwardly into said media through the sink product discharge in a quantity limited to maintain the self-sustaining character of said media.

13. The method of treating solids in liquids, which comprises the treatment of such a material in a substantially annular vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to horizontal movement of one margin thereof relative to an opposite margin thereof, until it becomes a self-sustaining mass of fluidized solids with only sufficient liquid to maintain its fluent condition, continuing said movement while feeding said material into the upper portion of said media body at a rate substantially equal to the rate of products discharge and thereby separating the constituents of said feed according to their sink and float characteristics in order to remove said constituents from the treatment as the respective discharge products, and introducing a limited quantity of liquid into the lower portion of the media by the displacement action of the sink product.

14. The method of treating solids in liquids, which comprises the treatment of such a material in a vertically-disposed annular zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to centrifugal movement of one margin thereof relative to an opposite margin thereof, until it becomes a self-sustaining mass of fluidized solids with only sufficient liquid to maintain its fluent condition, and continuing said movement while feeding said material into the upper portion of said media body at a rate substantially equal to the rate of products discharge to cause the float products to move upwardly inside of said annular zone at a faster rate than the sink product is caused to move downwardly along the outside of said zone, thereby separating said constituents according to their sink and float characteristics in said zone.

15. The method of treating solids in liquids, which comprises the treatment of such a material in a vertically-disposed annular zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media by subjecting it to centrifugal movement of one margin thereof relative to an opposite margin thereof, until it becomes a self-sustaining mass of fluidized solids with only sufficient liquid to maintain its fluent condition, continuing said movement while feeding said material into the upper portion of said media body at a rate substantially equal to the rate of products discharge to cause the low specific gravity product to move upwardly and the high specific gravity product to move downwardly to said zone, thereby separating said constituents according to their sink and float characteristics in said zone, and removing the float product from the treatment by overflow at the outside of said annular zone.

16. The method of treating solids in liquids, which comprises the treatment of such a material in a substantially annular, vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to horizontal centrifugal movement of one margin thereof relative to an opposite margin thereof, until it becomes a self-sustaining mass of fluidized solids with only sufficient liquid to maintain its fluent condition, continuing said movement while feeding said material into the upper portion of said media body at a rate substantially equal to the rate of products discharge and thereby separating the constituents of said feed according to their sink and float characteristics in order to remove said constituents from the treatment as the respective discharge products, and maintaining a body of liquid outside said annular zone into which the sink product discharges, said body having its surface at an elevation substantially above the elevation of the surface of the media in said annular zone.

17. The method of treating solids in liquids, which comprises the treatment of such a material in a vertically-disposed annular conical zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to horizontal centrifugal movement along one margin thereof relative to an opposite margin thereof, until it becomes a self-sustaining mass of fluidized solids with only sufficient liquid to maintain its fluent condition, and continuing said movement while feeding said material into the upper portion of said media body at a rate substantially equal to the rate of products discharge and thereby separating the constituents of said feed according to their sink and float characteristics in order to remove said constituents from the treatment as the respective discharge products.

18. The method of treating solids in liquids, which comprises the treatment of such a material in an arcuate vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to centrifugal movement along one margin thereof relative to an opposite margin thereof, until it becomes a self-sustaining mass of fluidized solids with only sufficient liquid to maintain its fluent condition, continuing said movement while feeding said material into the upper portion of said media body at a rate substantially equal to the rate of products discharge and thereby separating the constituents of said feed according to their sink and float characteristics in order to remove said constituents from the treatment as the respective discharge products, and collecting the sink product as the concentrate of said separation.

19. The method of treating solids in liquids, which comprises the treatment of such a material in an arcuate vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to centrifugal movement along one margin thereof relative to an opposite margin thereof, until it becomes a self-sustaining mass of fluidized solids with only sufficient liquid to maintain its fluent condition, continuing said movement while feeding said material into the upper portion of said media body at a rate substantially equal to the rate of products discharge and thereby separating the constituents of said feed according to their sink and float characteristics in order to remove said constituents from the treatment as the respective discharge products, and collecting the float product as the concentrate of said separation.

20. The method of treating solids in liquids, which comprises the treatment of such a material in an arcuate vertically-disposed zone having top and bottom discharges of float and sink products, said zone being sufficiently narrow throughout its vertical extent so that centrifugal effects are produced in the movement of material throughout said zone, forming a body of media in said zone by initially feeding material thereto in a quantity in excess of the rate of discharge therefrom, densifying said media body by subjecting it to centrifugal movement along one margin thereof relative to an opposite margin thereof, until it becomes a self-sustaining mass of fluidized solids with only sufficient liquid to maintain its fluent condition, continuing said movement while feeding said material into the upper portion of said media body at a rate substantially equal to the rate of products discharge and thereby separating the constituents of said feed according to their sink and float characteristics in order to remove said constituents from the treatment as the respective discharge products, maintaining a zone of discharge beneath said annular zone through which the sink product discharges, and subjecting material in both said zones to continuous agitation during the treatment.

21. Apparatus for treating solids in liquids, comprising a tank including a vertical circular wall and having an upper float product outlet and a bottom provided with a central sink product outlet, means for controlling the discharge through the lower outlet so as to form a body of media in the tank, a rotor, including an impeller having an outer continuous surface substantially parallel to the tank wall and its axis of rotation substantially concentric with said bottom outlet and arranged to define with the bottom of the tank a substantially unobstructed zone for a crowding discharge movement of the sink product to said bottom outlet and defining with the walls of the tank an annular treatment zone, said upper outlet being adjacent the top of said impeller and the lower outlet being adjacent the bottom of said rotor, means for introducing feed into said annular zone adjacent the top of said impeller, said tank bottom serving to support a body of media in the annular zone and the space between said rotor and the tank being relatively narrow at all points so that material in the annular zone and in the bottom unobstructed zone is maintained under the influence of said rotor until it escapes through said outlets, and means for rotating said impeller at a speed sufficient to agitate the material under treatment throughout the respective zones.

22. Apparatus for treating solids in liquids, comprising a frustro-conical tank having a vertical axis with the large portion of the cone at the top having an upper float product outlet and a bottom provided with a central sink product outlet, means for controlling the discharge through the lower outlet so as to form a body of media in the tank, a rotor, including a frustro-conical impeller having its axis of rotation substantially concentric with said bottom outlet and arranged to define with the bottom of the tank a substantially unobstructed zone for a crowding discharge movement of the sink product to said bottom outlet and defining with the walls of the tank an annular treatment zone, said upper outlet being adjacent the top of said impeller and the lower outlet being adjacent the bottom of said rotor, means for introducing feed into said annular zone adjacent the top of said impeller, said tank bottom serving to support a body of media in the annular zone and the space between said rotor and the tank being relatively narrow at all points so that material in the annular zone and in the bottom unobstructed zone is maintained under the influence of said rotor until it escapes through said outlets, and means for rotating said impeller at a speed sufficient to agitate the material under treatment throughout the respective zones.

23. Apparatus for treating solids in liquids, comprising a vertical cylindrical tank having an upper float product outlet and a bottom provided with a central sink product outlet, means for controlling the discharge through the lower outlet so as to form a body of media in the tank, a rotor, including a cylindrical impeller having its axis of rotation substantially concentric with said bottom outlet and arranged to define with the bottom of the tank a substantially unobstructed zone for a crowding discharge movement of the sink product to said bottom outlet and defining with the walls of the tank an annular treatment zone, said upper outlet being adjacent the top of said impeller and the lower outlet being adjacent the bottom of said rotor, means for introducing feed into said annular zone adjacent the top of said impeller, said tank bottom serving to support a body of media in the annular zone and the space between said rotor and the tank being relatively narrow at all points so that material in the annular zone and in the bottom unobstructed zone is maintained under the influence of said rotor until it escapes through said outlets, and means for rotating said impeller at a speed sufficient to agitate the material under treatment throughout the respective zones.

24. Apparatus for treating solids in liquids, comprising a tank including a vertical circular wall and having an upper float product outlet and a bottom provided with a central sink product outlet, means for controlling the discharge through the lower outlet so as to form a body of media in the tank, a rotor, including an impeller having an outer continuous surface substantially parallel to the tank wall and its axis of rotation substantially concentric with said bottom outlet and arranged to define with the bottom of the tank a substantially unobstructed zone for a crowding discharge movement of the sink product to said bottom outlet and defining with the walls of the tank an annular treatment zone, said upper outlet being adjacent the top of said impeller and the lower outlet being adjacent the bottom of said rotor, means for introducing feed into said annular zone adjacent the top of said impeller, said tank bottom serving to support a body of media in the annular zone and the space between said rotor and the tank being relatively narrow at all points so that material in the annular zone and in the bottom unobstructed zone is maintained under the influence of said rotor until it escapes through said outlets, and means for rotating said impeller at a speed to impart viscous movement to the media body throughout the depth of the annular zone.

25. Apparatus for treating solids in liquids, comprising a tank including a vertical circular wall and having an upper float product outlet and a bottom provided with a central sink product outlet, means for controlling the discharge through the lower outlet so as to form a body of media in the tank, a rotor, including an impeller having an outer continuous surface substantially parallel to the tank wall and its axis of rotation substantially concentric with said bottom outlet and arranged to define with the bottom of the tank a substantially unobstructed zone for a crowding discharge movement of the sink product to said bottom outlet and defining with the walls of the tank an annular treatment zone, said upper outlet being adjacent the top of said impeller and the lower outlet being adjacent the bottom of said rotor, means for introducing feed into said annular zone adjacent the top of said impeller, said tank bottom serving to support a body of media in the annular zone and the space between said rotor and the tank being relatively narrow at all points so that material in the annular zone and in the bottom unobstructed zone is maintained under the influence of said rotor until it escapes through said outlets, means for rotating said impeller at a speed sufficient to agitate the material under treatment throughout the respective zones, and liquid supply means arranged to feed liquid into the tank through said lower outlet.

26. A treatment as defined in claim 1, in which a middlings product is removed from the closed circuit as a non-floated product of one of said sink and float separations, which product is returned to the grinding stage of the circuit.

HARRY L. McNEILL.

REFERENCES CITED

The following references are of record in the file of this patent:

UNITED STATES PATENTS

| Number | Name | Date |
| --- | --- | --- |
| 2,174,553 | Daman | Oct. 3, 1939 |

(Other references on following page)

| Number | Name | Date | Number | Name | Date |
|---|---|---|---|---|---|
| 1,629,182 | Stull | May 17, 1927 | 1,241,861 | Leonard | Oct. 2, 1917 |
| 783,931 | Couper | Feb. 28, 1905 | 648,711 | Raasloff | May 1, 1900 |
| 1,890,206 | Andrews | Dec. 6, 1932 | 1,527,072 | Peck | Feb. 17, 1925 |
| 1,934,406 | Coe | Nov. 7, 1933 | 2,258,901 | Lykken | Oct. 14, 1901 |
| 856,612 | Wetherbee | June 11, 1907 | 2,109,234 | Keenan | Feb. 22, 1938 |
| 1,478,761 | Rousseau | Dec. 25, 1923 | 2,353,152 | Erck | July 11, 1944 |
| 1,614,876 | Chance | Jan. 18, 1927 | 1,104,132 | Prentiss | July 21, 1914 |
| 1,996,547 | Mason | Apr. 2, 1935 | 856,611 | Wetherbee | June 11, 1907 |
| 2,214,716 | Breerwood | Sept. 10, 1940 | 1,163,876 | Wetherbee | Dec. 14, 1915 |
| 788,799 | Strong | May 2, 1905 | | | |
| 1,301,544 | Crombie | Apr. 22, 1919 | | | |
| 1,014,080 | McTurk | Jan. 9, 1912 | | | |
| 641,359 | Barron | Jan. 16, 1900 | | | |
| 1,549,913 | Gale | Aug. 18, 1925 | | | |
| 1,936,130 | Germond | Nov. 21, 1933 | | | |
| 1,988,794 | Hill | Jan. 22, 1935 | | | |
| 2,316,982 | Wilson | Apr. 20, 1943 | | | |
| 2,052,004 | Remick | Aug. 25, 1936 | | | |

FOREIGN PATENTS

| Number | Country | Date |
|---|---|---|
| 351,631 | Italy | Aug. 17, 1937 |

OTHER REFERENCES

Richard and Locke, Textbook of Ore Dressing, 3d edition, 1940, pages 147 to 155.